(12) United States Patent
Pasquero et al.

(10) Patent No.: US 8,433,372 B2
(45) Date of Patent: Apr. 30, 2013

(54) SYSTEM AND METHOD FOR PROVIDING FEEDBACK TO A CALLER IN RESPONSE TO THE MODULATION OF AN INCOMING VOICE COMMUNICATION

(75) Inventors: Jerome Pasquero, Kitchener (CA); Jason Tyler Griffin, Kitchener (CA)

(73) Assignee: Research In Motion Limited, Waterloo (CA)

( * ) Notice: Subject to any disclaimer, the term of this patent is extended or adjusted under 35 U.S.C. 154(b) by 163 days.

(21) Appl. No.: 12/830,936

(22) Filed: Jul. 6, 2010

(65) Prior Publication Data

US 2012/0009905 A1 Jan. 12, 2012

(51) Int. Cl.
*H04M 1/00* (2006.01)

(52) U.S. Cl.
USPC ............ 455/569.1; 455/569.2; 455/345; 455/414.1; 455/412.2

(58) Field of Classification Search ............ 455/569.1, 455/569.2, 345, 414.1, 412.2
See application file for complete search history.

(56) References Cited

U.S. PATENT DOCUMENTS

| | | | |
|---|---|---|---|
| 2002/0111796 A1* | 8/2002 | Nemoto | 704/205 |
| 2005/0233736 A1* | 10/2005 | Berstis et al. | 455/416 |
| 2007/0041552 A1* | 2/2007 | Moscato | 379/214.01 |
| 2008/0077390 A1* | 3/2008 | Nagao | 704/7 |
| 2008/0165791 A1* | 7/2008 | DeGrazia | 370/412 |
| 2009/0002147 A1 | 1/2009 | Bloebaum et al. | |
| 2009/0298482 A1* | 12/2009 | Yen et al. | 455/414.2 |

OTHER PUBLICATIONS

"Situational Aware Text Reader: System for an Automotive Text Reader that Pauses, Changes the Speed of Reading, and Volume based on Situational Input from the Automobile and Environment", Oct. 21, 2005; http://priorartdatabase.com/IPCOM/000130389; IP.com, Inc.

"Hold that thought: driving while conversing"; NZTA Research: Dec. 2008; Issue 2; NZ Transport Agency.

Pohl, M.; Search Report from corresponding European Application No. 10168586.5; search completed Dec. 20, 2010.

* cited by examiner

*Primary Examiner* — Barry Taylor
(74) *Attorney, Agent, or Firm* — Brett J. Slaney; Blake, Cassels & Graydon LLP (57) ABSTRACT

In order to facilitate the modulation of speech delivery to a participant that is driving or otherwise performing a parallel task, a feedback mechanism is incorporated in order to inform the remote participant of the progress of the delivery of his/her speech at their end of the conversation. In this way, the remote participant is both aware of the modulation occurring at the other end and can adjust their speech to adapt to the current conditions, using the feedback as a guide.

23 Claims, 10 Drawing Sheets

SYSTEM AND METHOD FOR PROVIDING FEEDBACK TO A CALLER IN RESPONSE TO THE MODULATION OF AN INCOMING VOICE COMMUNICATION

TECHNICAL FIELD

The following relates to systems and methods for providing feedback to callers in response to the modulation of an incoming voice communication.

BACKGROUND

Using portable devices while driving can be dangerous because such use can be distracting and can lower reaction times for the driver. This practice is particularly applicable to conversing on a mobile phone, whether or not the mobile phone has a "hands-free" capability. Nevertheless, even when laws forbid using a mobile phone while driving, a hands-free option is typically allowed. Despite freeing up the driver's hands, participating in a conversation while driving can still be distracting and can create potentially dangerous conditions for both the driver and others on the road.

BRIEF DESCRIPTION OF THE DRAWINGS

Embodiments will now be described by way of example only with reference to the appended drawings wherein.

DETAILED DESCRIPTION OF THE DRAWINGS

In order to reduce distractions caused by engaging in a conversation (i.e. voice communication) using a mobile device, e.g. while driving or performing some other parallel task, the rate of speech delivery being provided to the recipient can be modulated such that it is better adapted to the immediate conditions facing the recipient. For example, it has been observed that when engaged in a conversation with another passenger in a vehicle, one or more of the participants in the conversation often slow down their speech or introduce pauses or delays while they are speaking in response to driving conditions such as bad weather, heavy traffic, high speeds, etc. The participants may even stop talking to one another when driving conditions are particularly demanding such as when slowing down, turning, or sudden or abrupt stops are required.

When conversing with another participant who is not in the vehicle, e.g. via a telephone call using a mobile device, the remote participant (the one that is not in the vehicle) typically does not react to the immediate driving conditions for at least the reason that they are not present to observe such conditions. As such, the conversation can become potentially dangerous to the participant in the vehicle.

The rate of delivery of speech to the participant in the vehicle can be modulated artificially, e.g. by detecting external events such as speed, acceleration, deceleration, light conditions, weather conditions, traffic conditions, time of day, location, turning and/or navigating an intersection, among many others. Mechanisms such as a GPS receiver can also be used to distinguish between different conditions, for example whether a driver is following a curve in a roadway versus making a turn at an intersection, in order to determine if the speech should be modified. The monitoring of events enables the immediate driving conditions to dictate the rate at which the participant in the vehicle is provided with an incoming voice signal from another participant. If the rate of speech or voice signal delivery is modified for the participant in the vehicle, the remote participant may be unaware that the delivery of their speech is being modulated and by how much. As a result, the remote participant may become frustrated due to the delay in receiving a reply from the participant in the vehicle and may even believe the connection is bad. Similarly, without being able to react to the introduction of a modulation of their speech at the other end, the remote participant may continue to speak at a rate that does not allow the other end to re-synchronize or "catch up".

In order to facilitate the modulation of speech delivery to a participant that is driving or otherwise performing a parallel task, a feedback mechanism can be incorporated in order to inform the remote participant of the progress of the delivery of his/her speech at their end of the conversation. In this way, the remote participant is both aware of the modulation occurring at the other end and can adjust their speech to adapt to the current conditions, using the feedback as a guide. As will be explained in greater detail below, the feedback can be provided in various forms, including tactile feedback (e.g. vibration or other discernible movements), audible feedback, visual feedback, or any combination thereof.

Figure 1:
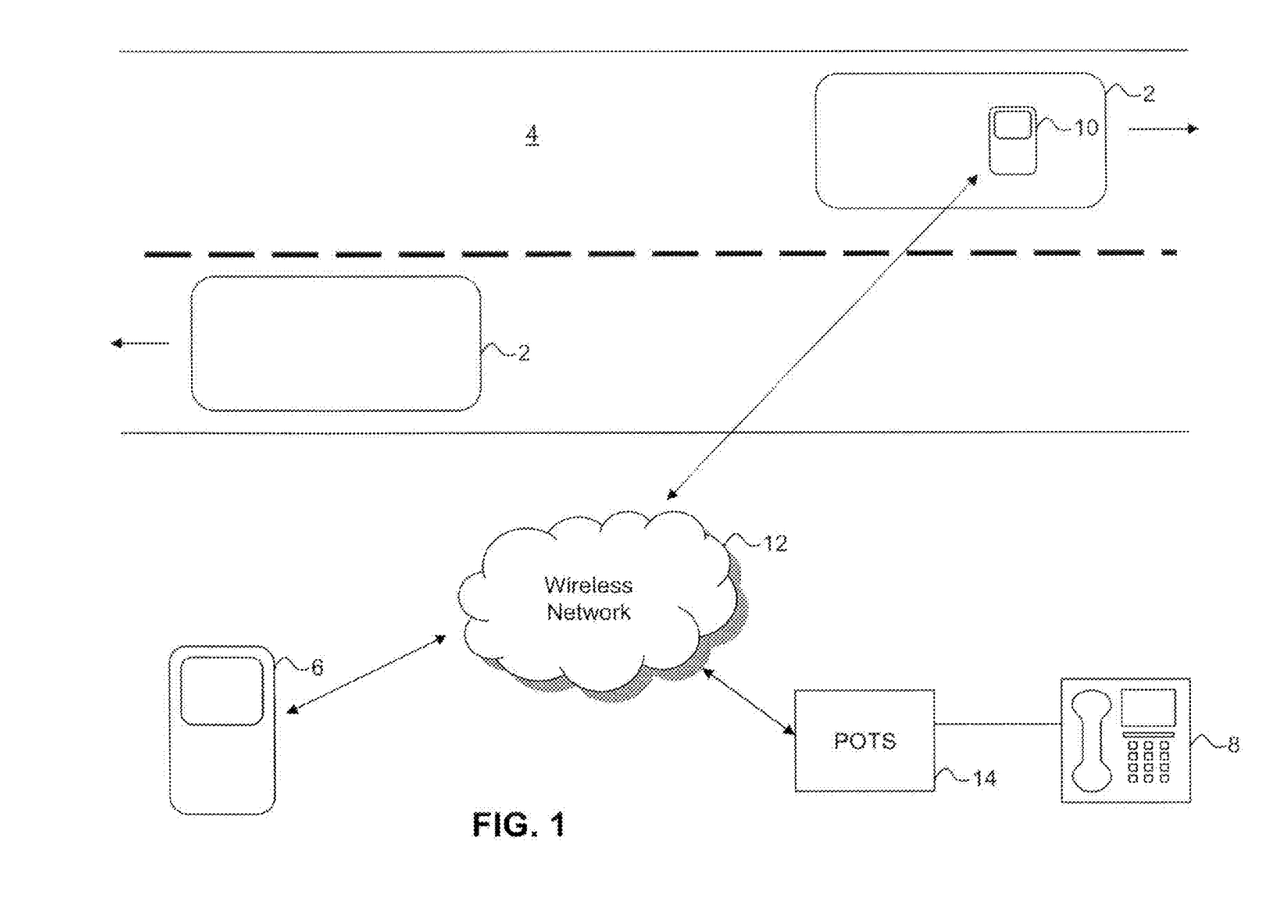
FIG. 1 is a pictorial view of the use of a mobile device in a moving vehicle for communicating with a remote participant via a wireless network.

Turning now to FIG. 1, a pictorial view of the use of a mobile device 10 in a moving vehicle 2 is shown. In this example, two vehicles 2 are shown moving in opposite directions on a road 4, with one of the vehicles 2 carrying a mobile device 10 that is participating in a voice communication with a remote participant and its remote device via a wireless network 12. It can be seen that the remote device can be another mobile device 6 or a landline telephone 8 connectable to the wireless network 12 via a plain old telephone service (POTS) 14 as is well known in the art and thus the remote device can be any telecommunications device configured for participating in voice communications.

Figure 2:
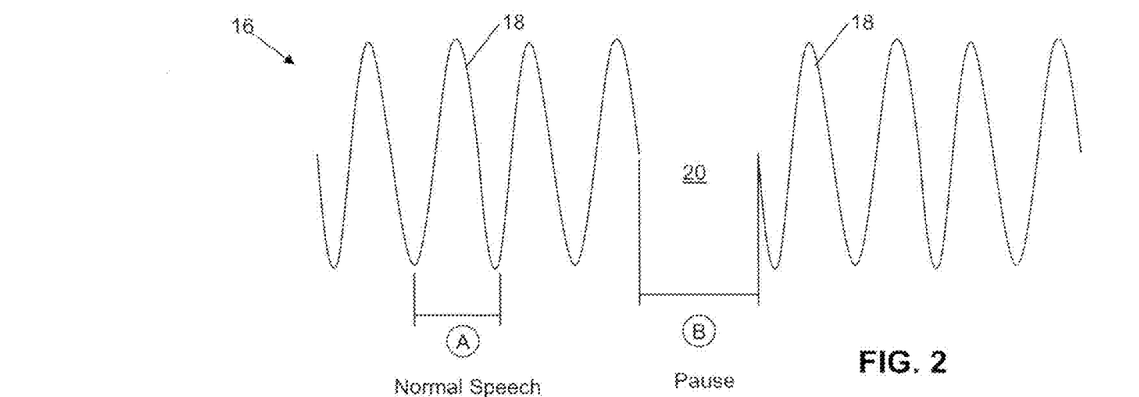
FIG. 2 is a waveform illustrating an example voice signal comprising a delay in speech delivery.

FIG. 2 illustrates a voice/speech waveform 16 that has been subjected to one example speech modulation technique, namely wherein the normal speech 18 is delayed or paused for a period of time, hereinafter referred to as a "delay 20". This technique effectively breaks up a speech waveform to provide pauses to the recipient participant for managing the delivery of speech according to one or more factors, criteria or external event as discussed by way of example below. It can be appreciated that the delays 20 may be used to mimic natural pauses that a participant may utilize when modulating their speech according to their environment (e.g. difficult driving conditions).

Figure 3:
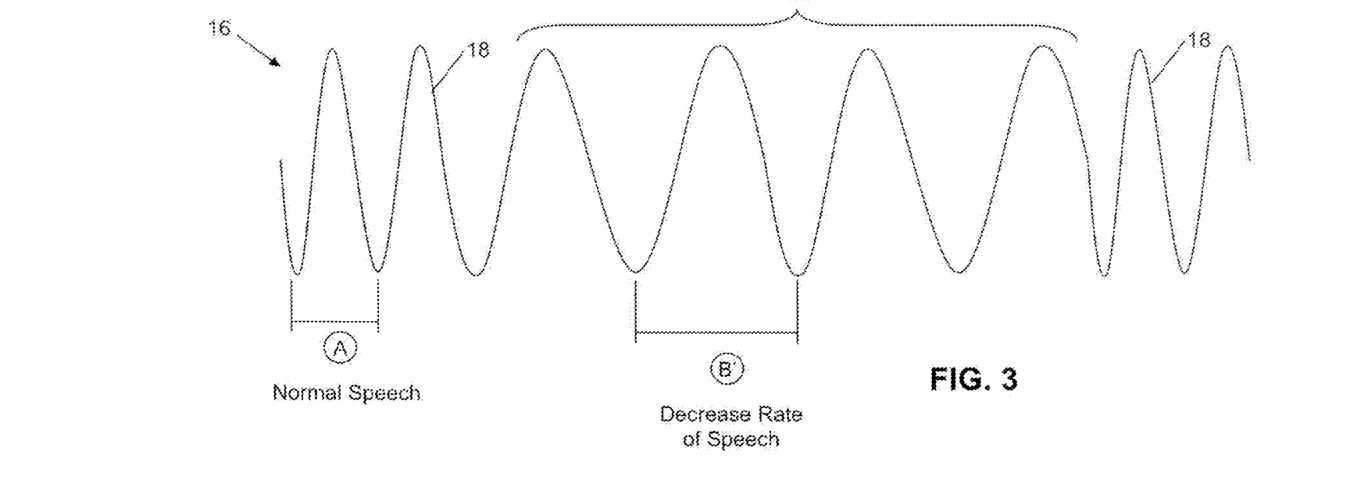
FIG. 3 is a waveform illustrating an example voice signal comprising a portion thereof modulated to decrease the rate of speech delivery.

FIG. 3 illustrates a speech waveform 16 that has been subjected to another example speech modulation technique, namely wherein the normal speech 18 is modified rather than interrupted. In this case the rate of speech delivery is decreased, thus providing a portion of the speech at a slower rate, hereinafter referred to as a "decreased rate change 22".

Figure 4:
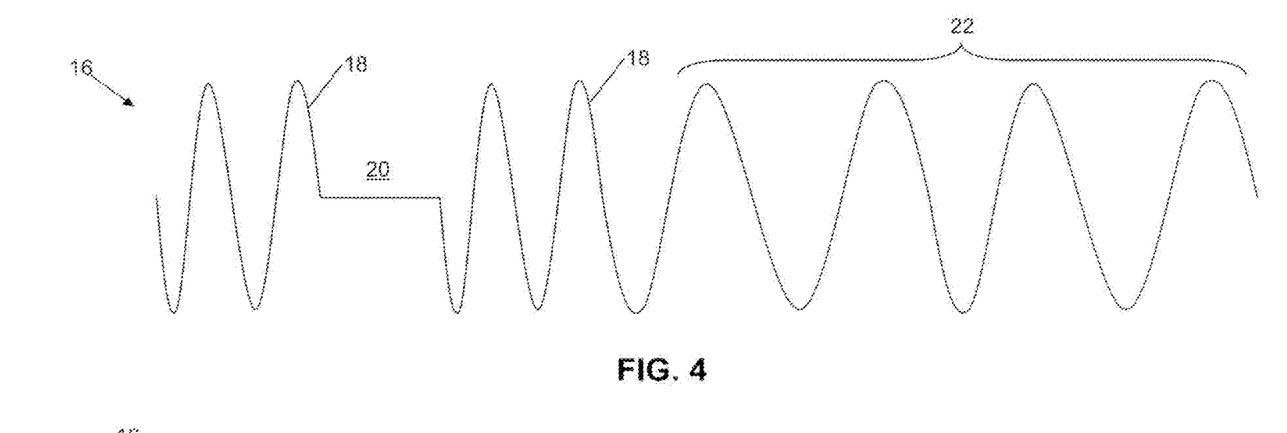
FIG. 4 is a waveform illustrating an example voice signal comprising both delays and portions thereof modulated to decrease the rate of speech delivery.

It can be appreciated that the two techniques shown in FIGS. 2 and 3 can also be combined such that the normal speech 18 is modified to include both delays 20 and rate changes 22 as shown in FIG. 4.

Figure 5:
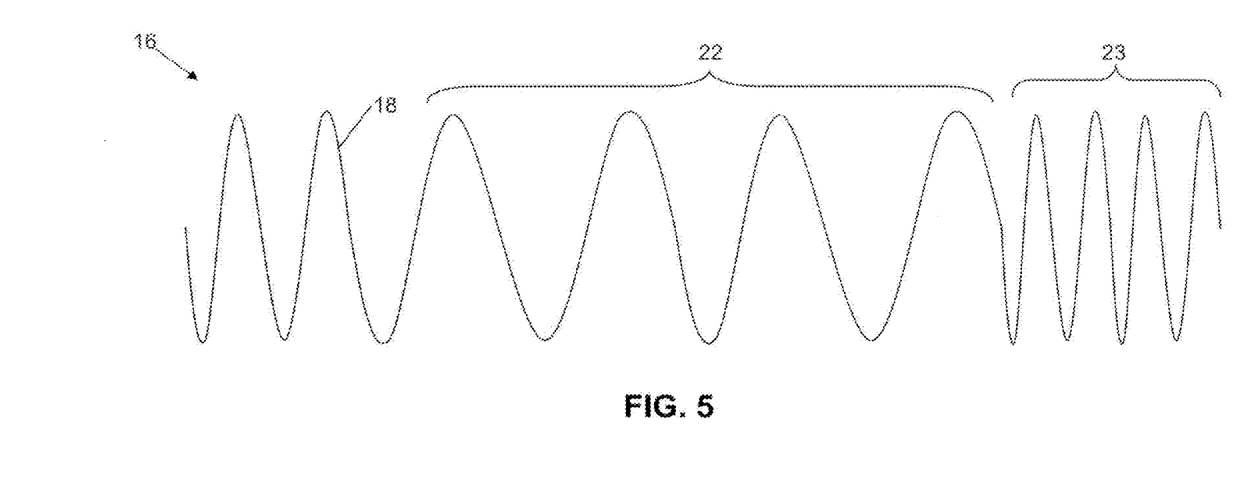
FIG. 5 is a waveform illustrating an example voice signal comprising a portion thereof modulated to decrease the rate of speech delivery following by a portion thereof modulated to increase the rate of speech delivery to re-synchronize the voice signal output.

It can also be appreciated that when slowing down or pausing speech delivery, there may be a need to re-synchronize or "catch up" the remote participant's speech at some point. Natural pauses in the conversation can allow for such re-synchronization, however, in other instances, it may be advantageous to artificially catch up the speech by speeding up the delivery at an appropriate time. As shown in FIG. 5, the signal 16 can thus include an increased rate change 23. In one example scenario, the external events can be used to detect that the mobile device 10 is stopped at a red light or has pulled over, etc. which would be an appropriate time to begin accelerating the speech delivery in order to "catch up". This can be particularly useful in situations where the conversation is relatively one-sided, such as when the mobile participant is using their mobile device 10 to listen in on a conference call or is not continuously engaged in, e.g., a multi-participant conversation.

Figure 6:
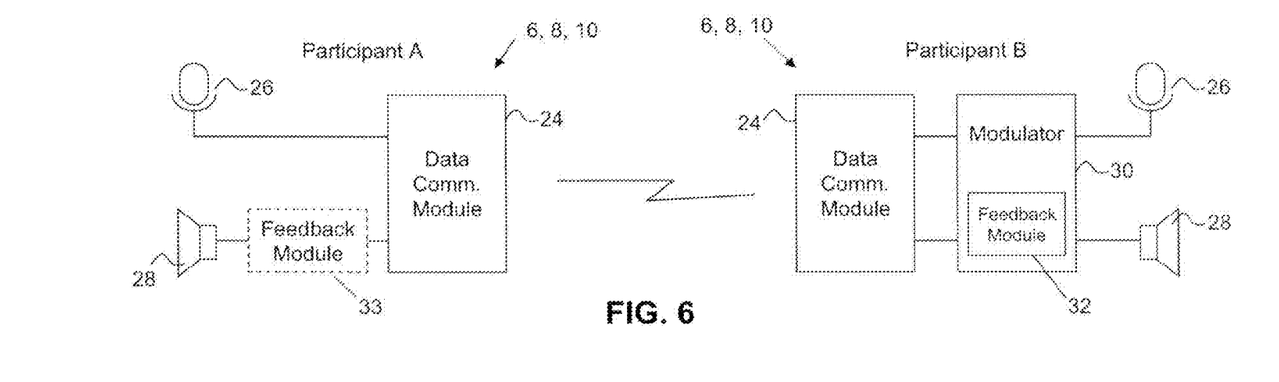
FIG. 6 is a block diagram illustrating example configurations for participants in exchanging voice communications wherein the mobile participant includes a modulator for modulating an incoming voice signal.

In order to control the delivery of speech to the remote device, as shown in FIG. 6, a modulator 30 can be used. In this example, each of two participants, Participant A and Participant B, communicate with each other in a voice communication via data communication modules 24. Each data communication module 24 can obtain voice inputs via a microphone 26 and can provide voice outputs (speech delivery) via a speaker 28 as is well known in the art. It is assumed in FIG. 6 that Participant B is communicating while driving or otherwise performing a parallel task and thus should have the delivery of speech to them controlled. As such, the data communication module 24 at Participant B uses a modulator 30 to control outputs to its speaker 28 and to generate feedback 36 (see also FIG. 7) to be sent to Participant A. As seen in FIG. 6, the modulator 30 may comprise a feedback module 32 that is used to generate the feedback 36. Although shown as part of the modulator 30 in FIG. 6 it can be appreciated that the feedback module 32 may also be a separate component or may be an integral part of the modulator 30 not requiring delineation therefrom. As such, it can also be appreciated that the feedback module 32 and modulator 30 can be separate and distinct components in some embodiments wherein the feedback module 32 operates independently from the modulator 30 by determining what if any modulation is being applied using the modulator 30. FIG. 6 also shows Participant A having a feedback module 32 to illustrate that the feedback 36 can be generated by Participant B and delivered via the voice channel or can be generated at Participant A's device 6, 8. For example, Participant B could send out-of-band information using another communication channel that is converted into the feedback 36 at the other end. As such, it can be appreciated that the feedback 36 can be delivered or otherwise provided to the remote device using any suitable delivery mechanism.

Figure 7:
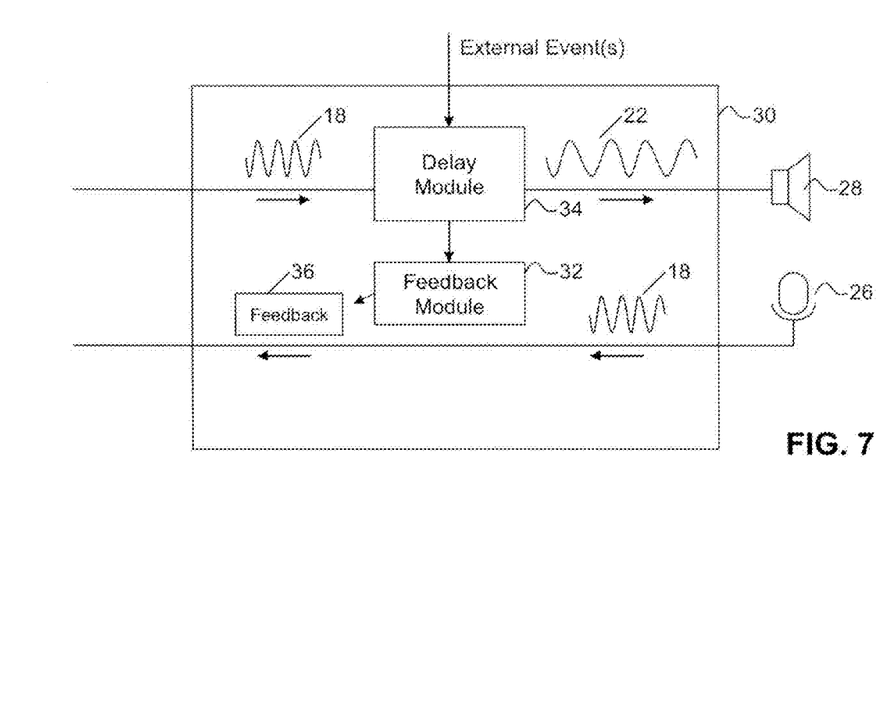
FIG. 7 is a block diagram illustrating an example configuration for the modulator of FIG. 6.

FIG. 7 provides one example configuration for the modulator 30 shown in FIG. 6. The modulator 30 in this embodiment provides a delay module 34 to intercept normal incoming speech signals 18 and references or otherwise relies on one or more external events to determine an appropriate delay 20 or rate change 22 to be applied to the signal 18. In this example, a rate change 22 is applied to slow down the speech at that particular time. The rate changed 22 output is then provided to the speaker 28 to be output to Participant B. The modulator 30 in this configuration also comprises a feedback module 32 which is controlled according to the delay 20 or rate changes 22, 23 applied to the incoming signal. Based on the way in which the incoming signal is modified, a "modulation factor" can be provided to the feedback module 32 and the feedback module 32 can use this modulation factor in order to generate feedback 36 to be sent to Participant A to indicate to them how their speech is being modified at the other end. It can be seen in FIG. 7 that in this embodiment, the normal speech signals 18 picked up by the microphone 26 at Participant B are still able to be communicated back to Participant A. Therefore, in this example, the feedback 36 is provided in conjunction with the voice signal 18 from Participant B and typically does not substantially interfere with or mask the voice signal 18. It can be appreciated however that in other embodiments, the feedback module 32 can intercept the voice signals 18 being sent back to Participant A in order to interleave or otherwise separate the feedback 36 from the voice signal 18.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, modulator 30, or accessible or connectable thereto. Any application or module herein described may be implemented using computer readable/executable instructions that may be stored or otherwise held by such computer readable media.

Figure 8:
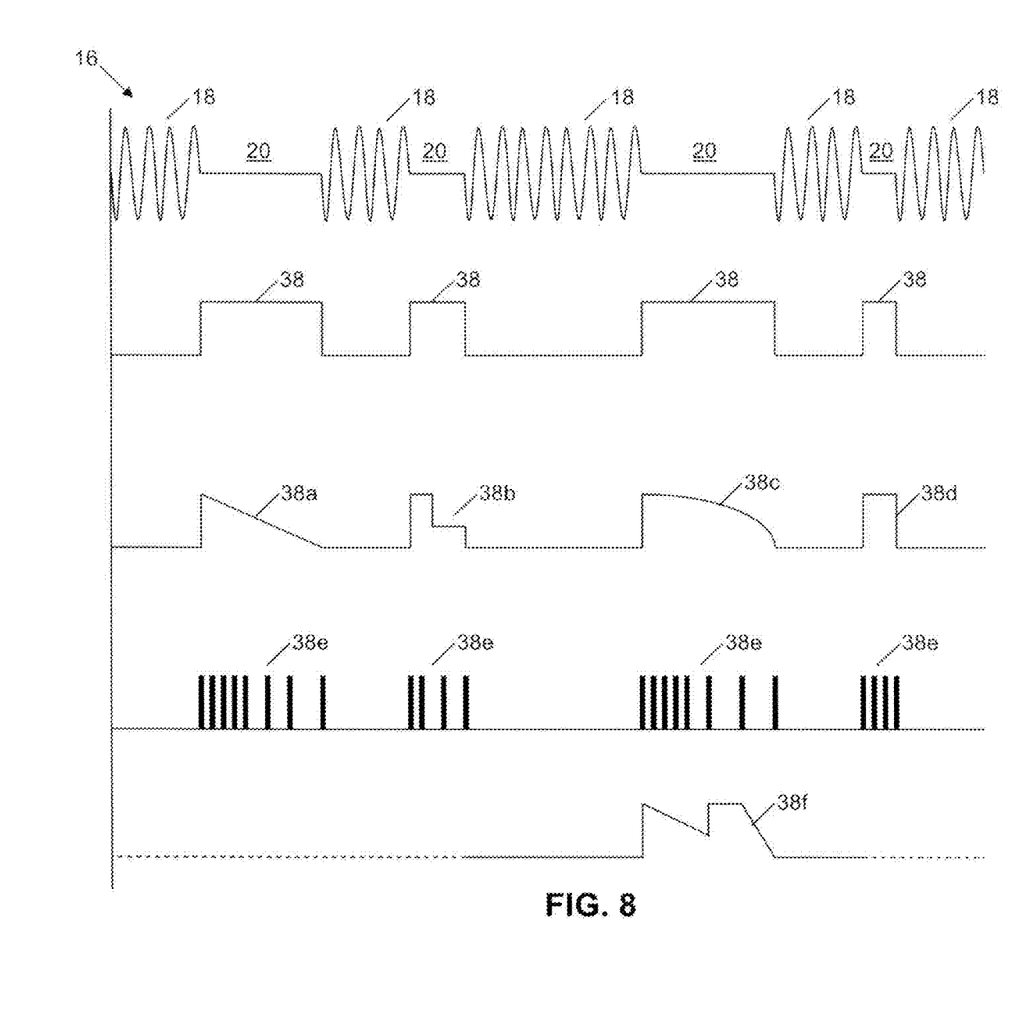
FIG. 8 is a waveform illustrating an example voice signal comprising a number of pauses or delays in speech delivery and a series of waveforms illustrating example feedback signals provided to a caller in response to the example voice signal.

The feedback 36 can take various forms, examples of which are shown in FIG. 8. FIG. 8 illustrates an example modulated signal 16 which, for ease of illustration, comprises a number of delays 20 introduced throughout the signal 16. FIG. 8 also illustrates a signal that corresponds to the modulated signal 16, wherein a feedback interval 38 coincides with a delay 20 in the signal 16. In FIG. 8, the feedback 36 is either provided during the feedback interval 38, or not provided otherwise, and thus resembles a pulse-width-modulated (PWM) signal. The form that the feedback 36 takes can vary, e.g. background music, beeps, visual output (progress bars, waveform output, etc.), etc. As such, each feedback interval 38 of the signal 16 shown in FIG. 8 represents a period of time in which the feedback 36 provides a distinguishable alert, notification, cue or other output to the remote device (i.e. Participant A in this example) to indicate to them that their speech signal 16 is being modulated.

Although the first example shown in FIG. 8 illustrates a constant signal within each feedback interval 38, the feedback 36 itself can vary during that interval 38. FIG. 8 also illustrates one example in which the feedback 36 during an interval 38a decreases in magnitude (e.g. volume decreases, colour changes, etc.) at a particular rate of change. FIG. 8 also illustrates feedback 36 which decreases in magnitude during an interval 38b in a stepped fashion. The stepped feedback interval 38b can be used to indicate a transition within the feedback interval 38b, e.g. as the delay 20 comes to an end. FIG. 8 also illustrates feedback 36 which decreases logarithmically, e.g. such that an audible feedback "fades" as a feedback interval 38c comes to an end. FIG. 8 also shown a feedback interval 36d that provides constant feedback 36 throughout that interval 36d. It can be appreciated that the different types of feedback intervals 38, 38a, 38b, 38c, 38d are only examples and a variety are shown in the same signal for illustrative purposes only. For example, one type of feedback interval 38 can be used for each delay 20 or different ones can be chosen under different circumstances in various applications.

FIG. 8 illustrates another feedback signal comprising feedback intervals 38e that provide discrete pulses within each interval 38e. For example, the feedback interval 38e may coincide with a series of beeps or tones. As can be seen, the frequency of such beeps or tones can vary to indicate to the remote device how much of their previous speech still needs to be delivered. In this example, the beeps slow down as the interval 38e comes to an end to signify that the remote device can begin to speak again. In this way, if delays 20 become long due to either poor driving conditions or due to rapid speech by the remote device, the beeps within the interval 38e will be more frequent for a longer period of time which can enable the remote device to react to the feedback 36 to allow the remote device to catch up.

It can be appreciated that by not only providing feedback 36 during the feedback intervals 38 but also varying the feedback 36 provided during the intervals 38f, the remote device can adapt their speech delivery to accommodate changing conditions. In this way, if they begin to speed up their speech due to a diminishing feedback 36, should conditions change, a new interval 38f can begin or the same interval 38f can be modified to increase the magnitude of the feedback 36 accordingly as shown in FIG. 8.

Figure 9:
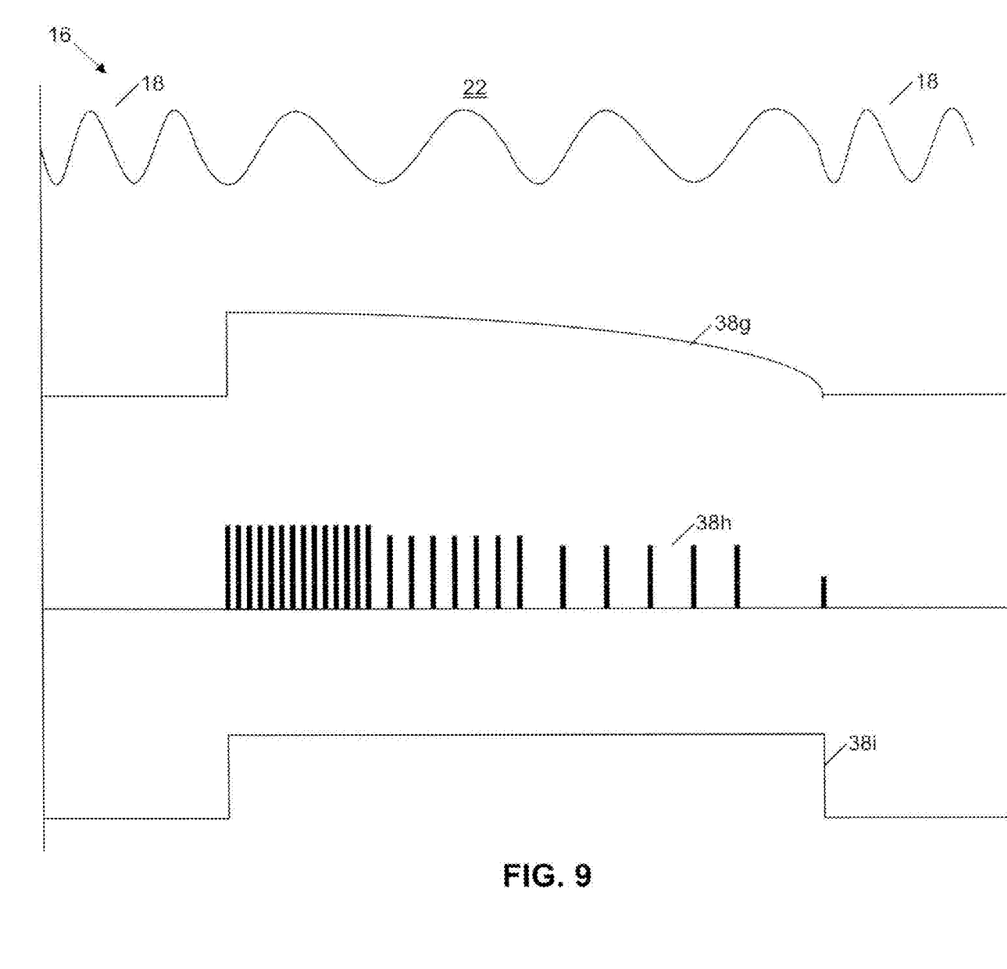
FIG. 9 is a waveform illustrating an example voice signal comprising a portion thereof modulated to decrease the rate of speech delivery and a series of waveforms illustrating example feedback signals provided to a participant in response to the example voice signal.

FIG. 9 illustrates another example waveform 16, which, in this example includes an decreased rate change 22. FIG. 9 also illustrates a feedback interval 38g wherein the magnitude of the feedback 36 decreases logarithmically. FIG. 9 also illustrates a feedback interval 38h which includes a series of discrete beeps or tones that both decrease in magnitude and increase in frequency as the interval 38h progresses. FIG. 9 also illustrates a feedback interval 38i which includes a constant feedback 36 throughout. Therefore, it can be appreciated from FIG. 9 that the principles shown in FIG. 8 can also be applied to speech waveforms that are modulated using a rate change 22.

Figure 10:
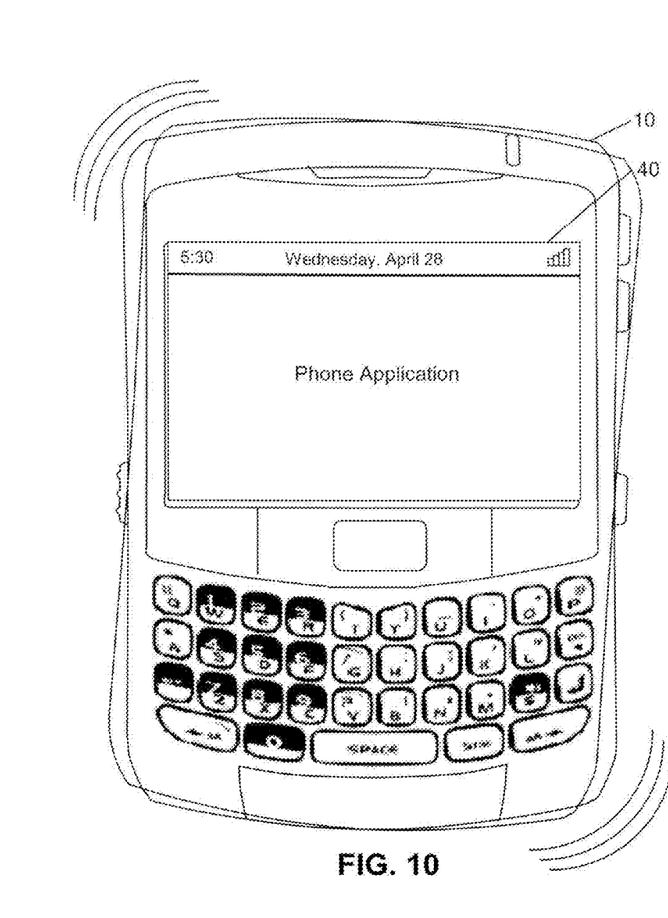
FIG. 10 is an external view of an example mobile device providing tactile feedback through a vibration of the mobile device.

Turning now to FIG. 10, an example external view of a mobile device 10 is shown, the mobile device 10 displaying an interface 40. In FIG. 10, the mobile device 10 is providing a tactile feedback (e.g. vibration) as indicated by the movement lines. Tactile feedback is particularly advantageous as it would not interfere with the audio/speech delivery of the ongoing conversation. Moreover, the remote participant would not be required to move their device away from their ear, for example to observe visual feedback. Instead, the tactile feedback would be felt through the user's hand.

Figure 11:
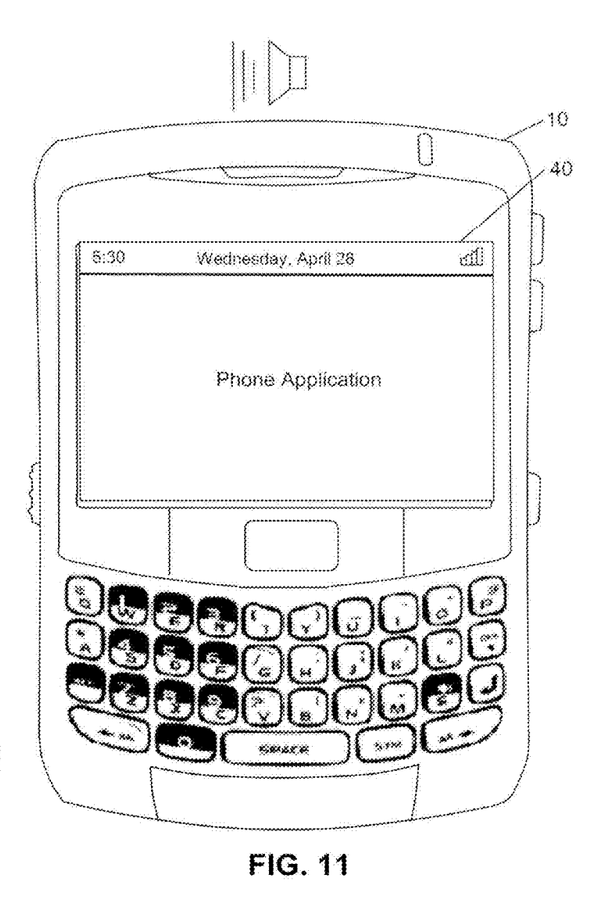
FIG. 11 is an external view of an example mobile device providing audible feedback through a speaker.

As discussed above, the feedback 36 may also be an audible feedback in the form of background music, beeps or tones, pre-recorded messages indicative of an external event, and the like. FIG. 11 illustrates a mobile device 10 delivering an audible feedback 36. The audible feedback 36 may be particularly advantageous in hands-free systems wherein the display of the mobile device 10 may not be accessible.

Figure 12:
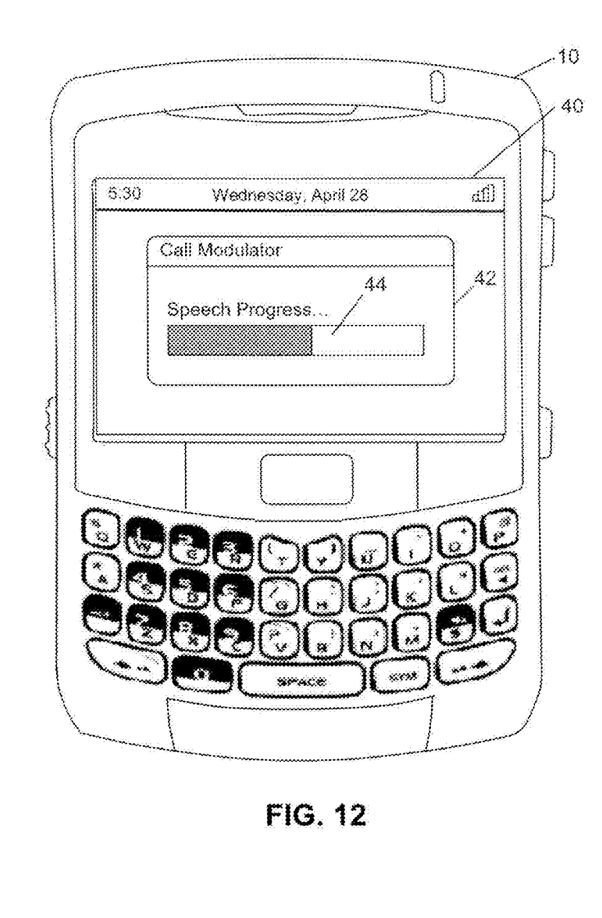
FIG. 12 is an external view of an example mobile device displaying a call modulator speech progress bar.

As also discussed above, the feedback 36 may be visual in nature. In FIG. 12, the interface 40 includes or has overlaid thereon, a call modulation interface component 42 (e.g. a pop-up window as shown). The call modulation progress interface component 42 in this example includes a progress bar 44 which provides visual feedback 36 indicative of the progress of delivery of the remote participant's speech. The progress bar 44 can be displayed whenever a delay 20 or rate change 22 is required and during the corresponding feedback interval 38 in order to indicate to the remote participant, how much of their speech has been delivered and at what rate. It can be appreciated that the progress bar 44 can be displayed in combination with an audible, tactile, or any other type of feedback 36, or can be displayed instead of such feedback 36. For example, the progress bar 44 or other visual feedback 36 can be linked to a user's profile such that if they do not wish to receive audible notifications for other communications, they instead receive the visual feedback 36. When used in combination, the interface component 42 can assist the user in identifying what event corresponds to the audible alert, which can be particularly advantageous when the mobile device 10 uses multiple audible alerts for multiple reasons.

Figure 13:
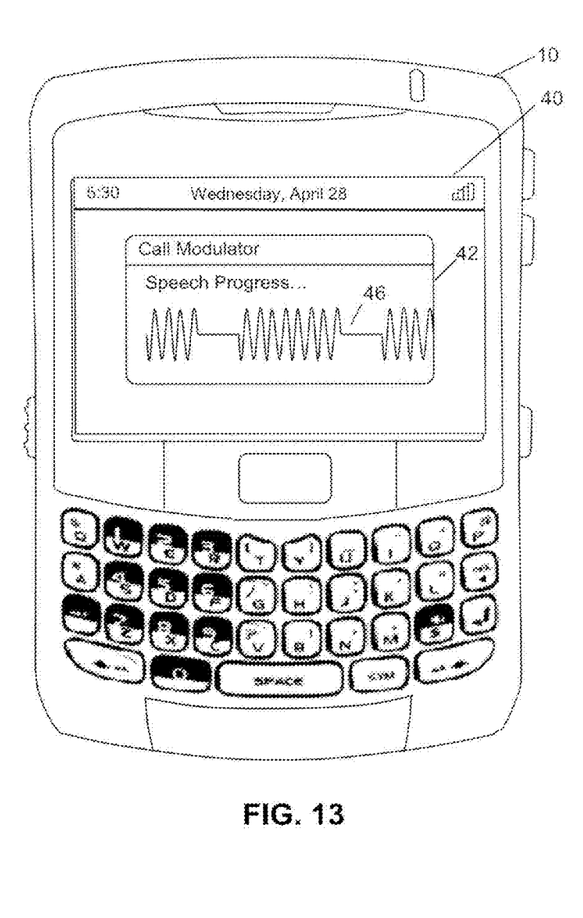
FIG. 13 is an external view of an example mobile device displaying a representation of the modulated voice signal.

FIG. 13 illustrates another example of visual feedback 36, wherein the interface component 42 includes a speech waveform 46 that resembles the actual progress of the speech as it is delivered to the recipient (mobile) participant. It can be appreciated that the examples shown in FIGS. 10 to 13 are for illustrative purposes and various other visual cues or notifications can be used. For example, a blinking element can be used that mimics audible beeping or replaces such audible beeping. Also, a visual element that changes colour can also be used, e.g. from red to yellow to green to indicate when the remote participant should begin to speak again. Any combination of these elements can be incorporated into the feedback 36 and in some embodiments, such elements can be user configurable or set according to preferences. IT policies or other criteria. Moreover, as noted above and illustrated in FIG. 10, tactile feedback such as movement or vibration of the remote device used by the remote participant can also be used, either alone or in combination with one or more of the visual and audible feedback types.

Figure 14:
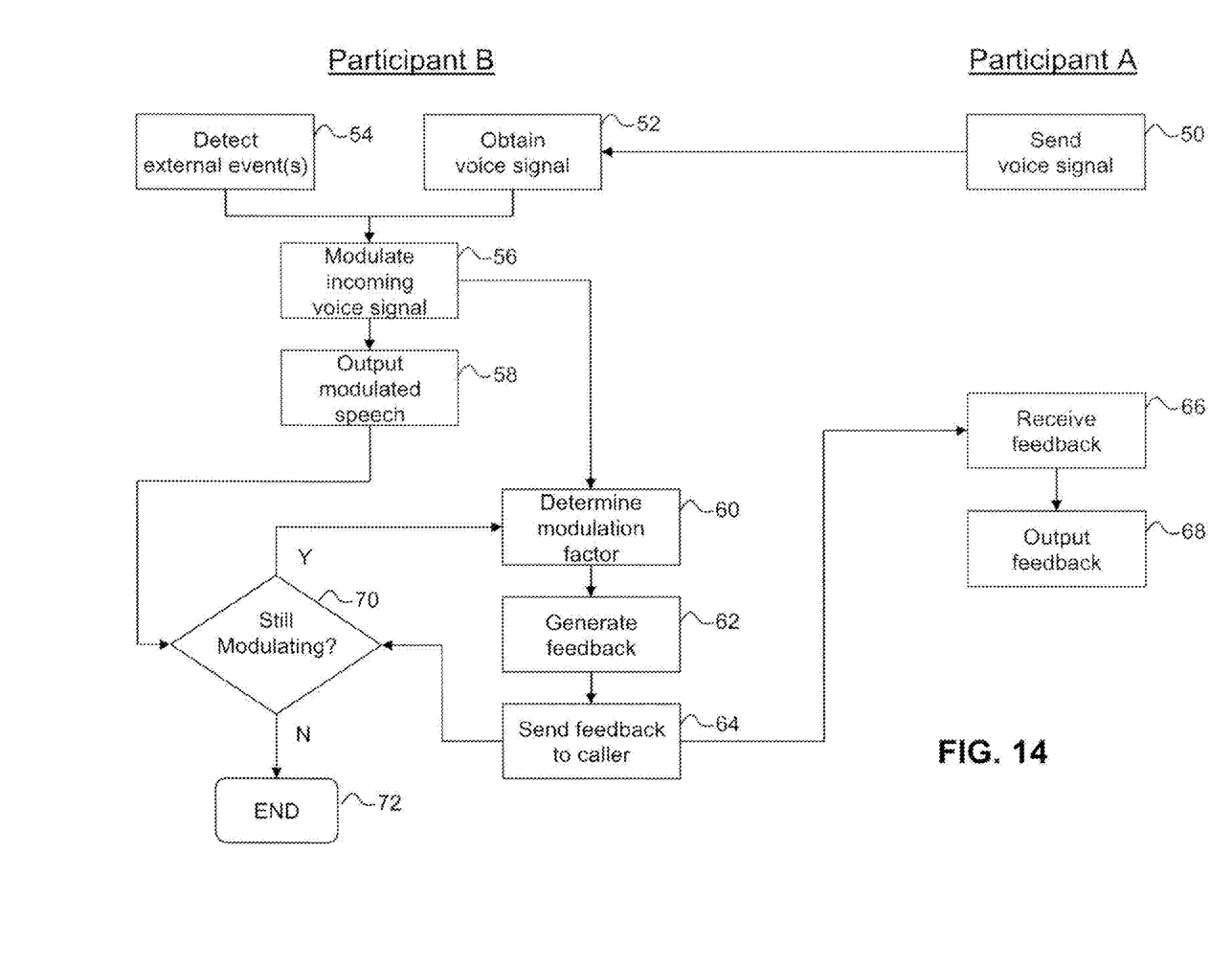
FIG. 14 is a flow chart illustrating an example set of computer executable instructions for generating feedback for a remote participant in response to the modulation of an incoming voice signal for a mobile participant.

FIG. 14 illustrates a set of example computer executable instructions that may be performed by the modulator 30 in order to both modulate a voice signal on the mobile device 10 and provide feedback 36 to the remote participant (i.e. the other caller). At 50, it is assumed in this example that Participant A initiates a call and a voice signal is sent to Participant B. The voice signal is obtained by the mobile device 10 for Participant B at 52. In this example, one or more external events are detected at 54 which causes the modulator 30 to modulate the incoming signal at 56, e.g. impose one or more delays 20, one or more rate changes 22, 23 or a combination of both. The modulated speech is then output by the modulator 30 at 58. For example, tactile feedback 36 as illustrated in FIG. 10, audible feedback 36 as shown in FIG. 11 to provide a series of beeps, background music, etc., or a visual output may be displayed as shown in FIGS. 12 and 13 according to the waveforms shown in FIGS. 8 and 9. Once the signal is modulated at 56, a modulation factor can also be determined at 60 in order to generate feedback for Participant A. For example, as shown in FIGS. 2 and 3, the length of the pause or delay 20 (denoted B) or the decrease in the rate of speech (denoted B') can be used to determine the nature of the feedback 36 to be provided during one or more feedback intervals 38. The feedback 36 is then generated at 62 and sent to the remote device (in this example the caller) at 64. The feedback 36 is then received by Participant A at 66 and the feedback 36 output at 68. It can be appreciated that Participant A may be using a mobile device 10 or another device such as a telephone 8 as discussed above.

After the feedback 36 is sent to Participant A, the modulator 30 then determines if the voice signal is still being modulated at 70. If so, the modulator can return to 60 in order to continue to modify the feedback 36 or otherwise determine when the delay 20 or rate change 22 is no longer required. If the modulation is no longer being applied, the modulator's process ends at 72.

Figure 15:
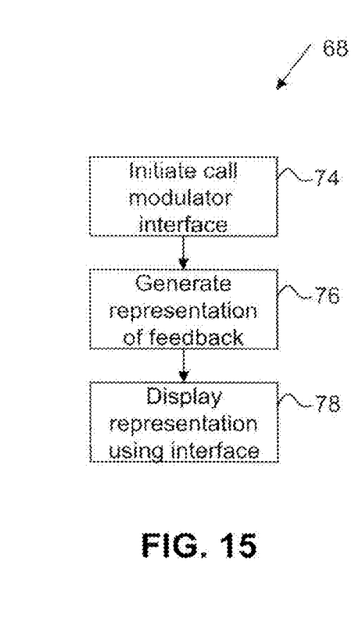
FIG. 15 is a flow chart illustrating an example set of computer executable instructions for outputting the feedback at the remote participant using a graphical representation of the feedback.

Turning now to FIG. 15, an example set of computer executable instructions are illustrated that may be performed by Participant A's device in outputting the feedback 36 at 68. For example, if Participant A is using a mobile device 10 that also has a modulator 33 or otherwise has some form of a feedback module 33 as shown in FIG. 6, the feedback module 30 or modulator 30 may initiate the modulator interface 42 at 74, generate a representation of the feedback 36 at 76 (e.g. progress bar 44 or waveform 46), and the representation is displayed at 78, e.g. as shown in FIG. 12 or 13. It can be appreciated that similar operations may be performed for other types of feedback 36. For example, audible feedback 36 may require initiation of a speaker module, the generation of the audible signal, and the output of this audible signal over the speaker 28. Similarly, tactile feedback 36 may require initiation of a vibration system.

Figure 16:
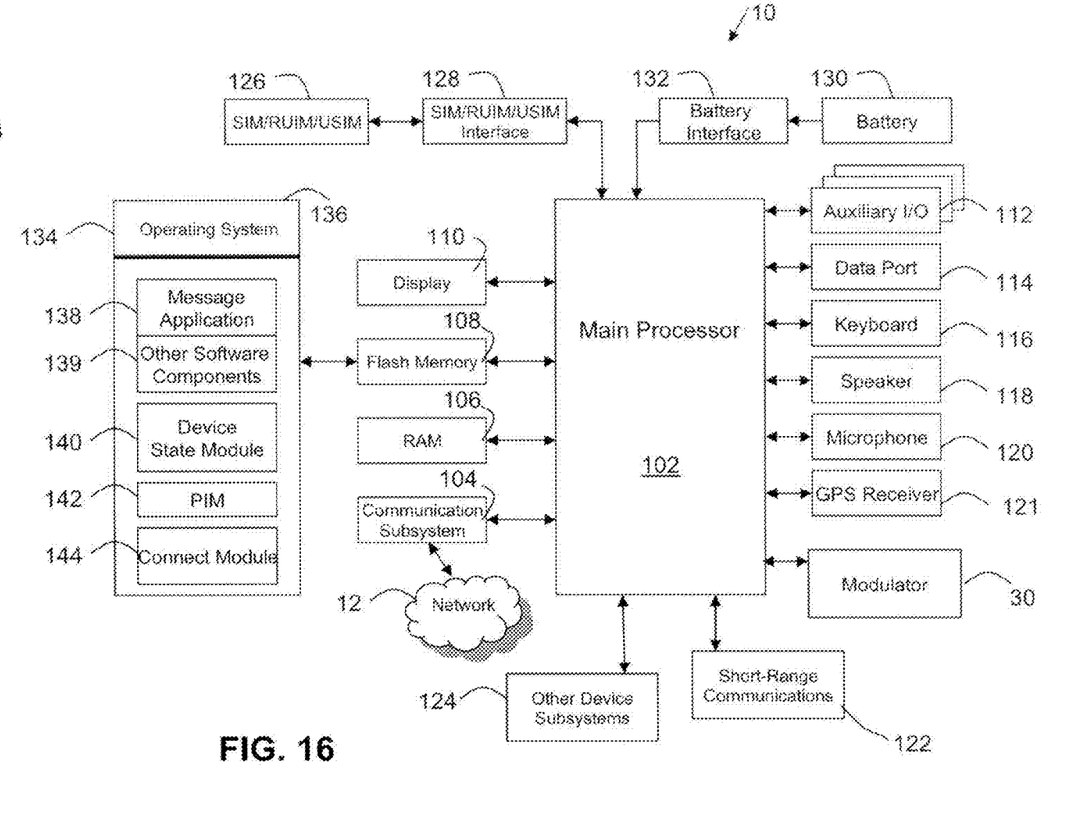
FIG. 16 is a block diagram of an example embodiment of a mobile device.

FIG. 16 provides a block diagram of an example embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 12. In this example embodiment of the mobile device 10, the communication subsystem 104 is configured in accordance with the GSM and GPRS standards, which are used worldwide. Other communication configurations that are equally applicable are the 3G and 4G networks discussed above. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 12 represents one or more different Radio Frequency (RF) channels, operating according to defined protocols specified for GSM/GPRS communications.

The main processor 102 may also interact with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124. As will be discussed below, the short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

It can be appreciated that the keyboard 116 may include a physical keyboard or a virtual or "soft" keyboard (not shown) which may be implemented, for example, by providing images of keys rendered on a touch screen, OLED, etc.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 12, and device-resident functions such as a calculator or task list.

The mobile device 10 can send and receive communication signals over the wireless network 12 after required network registration or activation procedures have been completed. Network access is associated with a subscriber or user of the mobile device 10. To identify a subscriber, the mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 10 is not fully operational for communication with the wireless network 12. Once the SIM/RUIM/USIM 126 is inserted into the SIM/RUIM/USIM interface 128, it is coupled to the main processor 102.

The mobile device 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Software applications may include a message application 138, a device state module 140, a Personal Information Manager (PIM) 142, a connect module 144 and an IT policy module 146. A message application 138 can be any suitable software program that allows a user of the mobile device 10 to send and receive electronic messages, wherein messages are typically stored in the flash memory 108 of the mobile device 10. A device state module 140 provides persistence, i.e. the device state module 140 ensures that important device data is stored in persistent memory, such as the flash memory 108, so that the data is not lost when the mobile device 10 is turned off or loses power. A PIM 142 includes functionality for organizing and controlling data items of interest to the user, such as, but not limited to, e-mail, text messages, instant messages, contacts, events, and voice mails, and may interact with the wireless network 12. A connect module 144 implements the communication protocols that are required for the mobile device 10 to communicate with the wireless infrastructure and any host system 25, such as an enterprise system, that the mobile device 10 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc. The additional applications 139 can be loaded onto the mobile device 10 through at least one of the wireless network 12, the auxiliary I/O subsystem 112, the data port 114, the short-range communications subsystem 122, or any other suitable device subsystem 124.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use a touch-sensitive overlay (not shown) on the display 110 that is part of a touch screen display (not shown), in addition to possibly the auxiliary I/O subsystem 112. The auxiliary I/O subsystem 112 may include devices such as: a mouse, track ball, infrared fingerprint detector, optical trackpad, or a roller wheel with dynamic button pressing capability. A composed item may be transmitted over the wireless network 12 through the communication subsystem 104.

Although the above principles have been described with reference to certain specific embodiments, various modifications thereof will be apparent to those skilled in the art without departing from the scope of the claims appended hereto.

The invention claimed is:

1. A method of operating a mobile device, the method comprising:
automatically modulating an incoming voice signal from a remote device on the mobile device to control output thereof in response to at least one external event;
generating feedback indicative of the modulation of the incoming voice signal upon modulating the incoming voice signal, the feedback being generated based on how the incoming voice signal is being modulated; and
providing the feedback to the remote device in conjunction with an outgoing voice signal while the incoming voice signal is being modulated and without interfering with the outgoing voice signal.

2. The method according to claim 1, further comprising determining one or more intervals wherein the modulation is being applied; and generating a feedback signal to deliver the feedback during the one or more intervals.

3. The method according to claim 2, wherein at least one of a magnitude and a frequency of the feedback is varied within an interval.

4. The method according to claim 1, the incoming voice signal being modulated according to the at least one external event.

5. The method according to claim 1, wherein the feedback enables an audible output to be provided at the remote device.

6. The method according to claim 5, wherein the audible output enables at least one of a series of discrete tones, a pre-recorded message, and background music to be provided at the remote device.

7. The method according to claim 1, wherein the feedback enables a visual output to be provided at the remote device.

8. The method according to claim 7, wherein the visual output enables at least one of a progress bar and a representation of the modulation to be provided at the remote device.

9. The method according to claim 1, wherein the feedback enables a tactile output to be provided at the remote device.

10. The method of claim 1, further comprising re-synchronizing the voice signal after detecting a further external event.

11. A method of operating a telecommunications device, the method comprising:
sending an outgoing voice signal to a remote mobile device;
receiving feedback indicative of a modulation of the outgoing voice signal in conjunction with an incoming voice signal while the outgoing voice signal is be modulated and without interfering with the incoming voice signal, the modulation occurring automatically at the remote mobile device in response to at least one external event detected by the remote mobile device, the feedback having been generated by the remote mobile device upon determining that the outgoing voice signal is being modulated, the feedback having been generated based on how the outgoing voice signal is being modulated; and
outputting the feedback and the incoming voice signal.

12. The method according to claim 11, wherein at least one of a magnitude and a frequency of the feedback is varied within one or more intervals in a received feedback signal.

13. The method according to claim 11, wherein the outgoing voice signal has been modulated according to the at least one external event.

14. The method according to claim 11, wherein the feedback comprises an audible output.

15. The method according to claim 14, wherein the audible output comprises at least one of a series of discrete tones, a pre-recorded message, and background music.

16. The method according to claim 11, wherein the feedback comprises a visual output.

17. The method according to claim 16, wherein the visual output comprises at least one of a progress bar and a representation of the modulation to be provided at the telecommunications device.

18. The method of claim 16, wherein the visual output is displayed instead of an audible output according to a user profile.

19. The method according to claim 11, wherein the feedback comprises a tactile output.

20. A mobile device comprising a communication subsystem configured for participating in voice communications, the communication subsystem being configured for:
automatically modulating an incoming voice signal from a remote device on the mobile device to control output thereof in response to at least one external event;
generating feedback indicative of the modulation of the incoming voice signal upon modulating the incoming voice signal, the feedback being generated based on how the incoming voice signal is being modulated; and
providing the feedback to the remote device in conjunction with an outgoing voice signal while the incoming voice signal is being modulated and without interfering with the outgoing voice signal.

21. A computer readable medium comprising computer executable instructions for:
automatically modulating an incoming voice signal from a remote device on the mobile device to control output thereof in response to at least one external event;
generating feedback indicative of the modulation of the incoming voice signal upon modulating the incoming voice signal, the feedback being generated based on how the incoming voice signal is being modulated; and
providing the feedback to the remote device in conjunction with an outgoing voice signal while the incoming voice signal is being modulated and without interfering with the outgoing voice signal.

22. A telecommunications device configured for participating in voice communications, the device being further configured for:
sending an outgoing voice signal to a remote mobile device;
receiving feedback indicative of a modulation of the outgoing voice signal in conjunction with an incoming voice signal while the outgoing voice signal is be modulated and without interfering with the incoming voice signal, the modulation occurring automatically at the remote mobile device in response to at least one external event detected by the remote mobile device, the feedback having been generated by the remote mobile device upon determining that the outgoing voice signal is being modulated, the feedback having been generated based on how the outgoing voice signal is being modulated; and
outputting the feedback and the incoming voice signal.

23. A computer readable medium comprising computer executable instructions for:
sending an outgoing voice signal to a remote mobile device;
receiving feedback indicative of a modulation of the outgoing voice signal in conjunction with an incoming voice signal while the outgoing voice signal is be modulated and without interfering with the incoming voice signal, the modulation occurring automatically at the remote mobile device in response to at least one external event detected by the remote mobile device, the feedback having been generated by the remote mobile device upon determining that the outgoing voice signal is being modulated, the feedback having been generated based on how the outgoing voice signal is being modulated; and
outputting the feedback and the incoming voice signal.

* * * * *

UNITED STATES PATENT AND TRADEMARK OFFICE
CERTIFICATE OF CORRECTION

PATENT NO. : 8,433,372 B2  
APPLICATION NO. : 12/830936  
DATED : April 30, 2013  
INVENTOR(S) : Jerome Pasquero and Jason Tyler Griffin Page 1 of 1

It is certified that error appears in the above-identified patent and that said Letters Patent is hereby corrected as shown below:

In the Claims:

Col. 12, in claim 22, line 14 and claim 23, line 31 "be modulated" is replaced with "being modulated".

Signed and Sealed this
Eighteenth Day of June, 2013

Teresa Stanek Rea
*Acting Director of the United States Patent and Trademark Office*